(No Model.) 3 Sheets—Sheet 1.

J. C. BROOKS.
ELECTRIC STOP MOTION FOR LOOMS.

No. 473,378. Patented Apr. 19, 1892.

Witnesses:
J. B. McGirr
Arthur L. Bryant

Inventor:
John C. Brooks
By his Attorneys,
Edson Bros.

(No Model.) 3 Sheets—Sheet 2.
J. C. BROOKS.
ELECTRIC STOP MOTION FOR LOOMS.
No. 473,378. Patented Apr. 19, 1892.
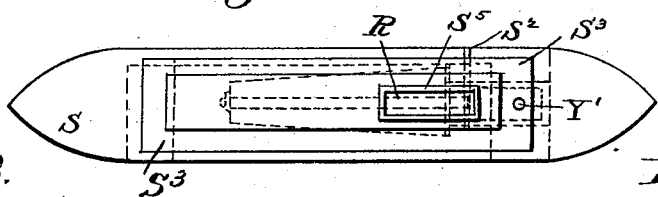
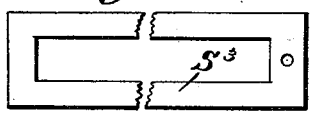
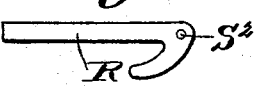
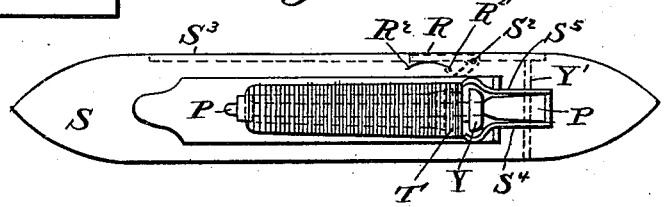
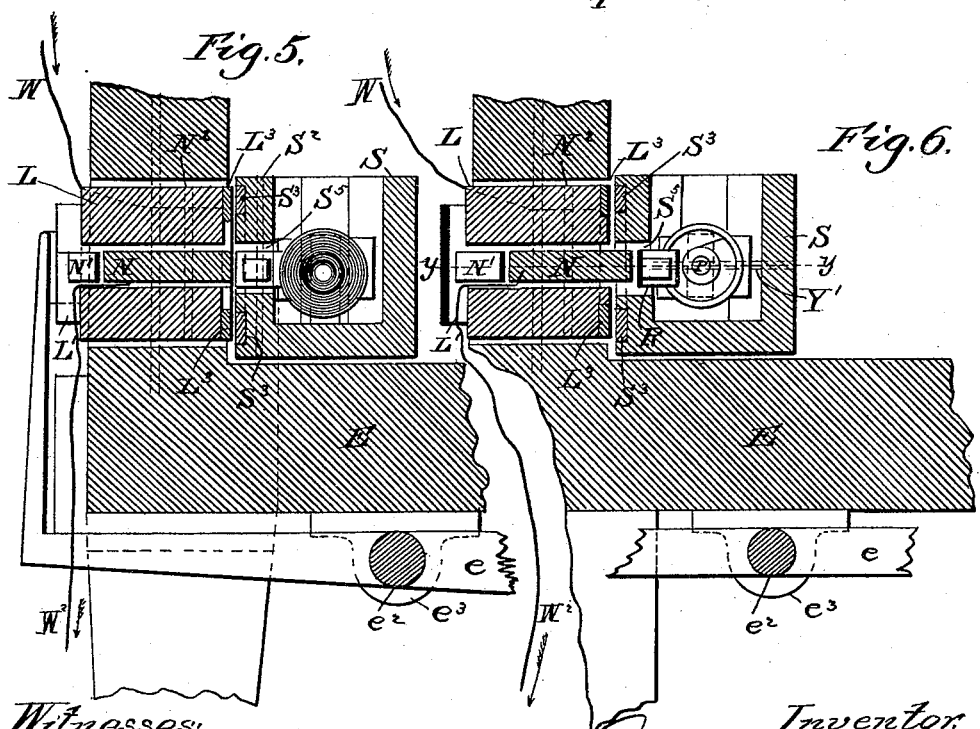
Witnesses:
J. B. McGirr.
Arthur L. Bryant.
Inventor:
John C. Brooks.
By his Attorneys,
Edson Bros.

(No Model.)　　　　　　　　　　　　　　　　　3 Sheets—Sheet 3.
J. C. BROOKS.
ELECTRIC STOP MOTION FOR LOOMS.
No. 473,378.　　　　　　　　　　　Patented Apr. 19, 1892.
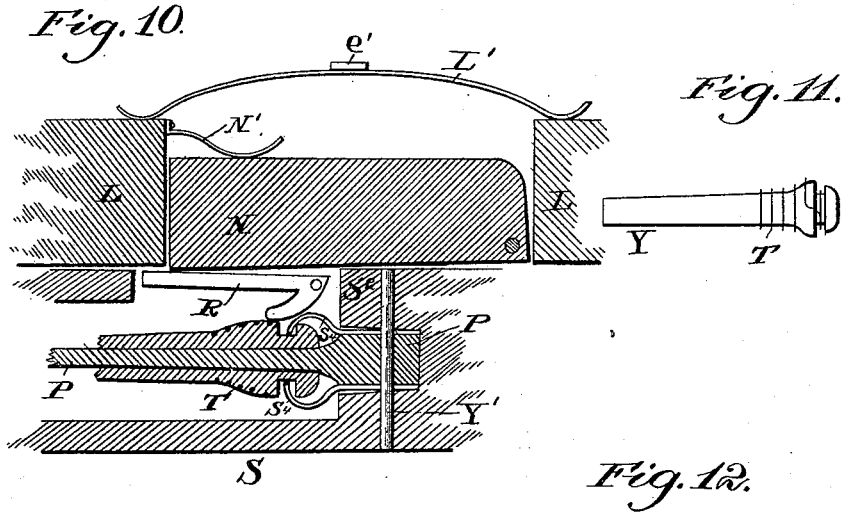
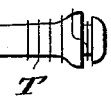
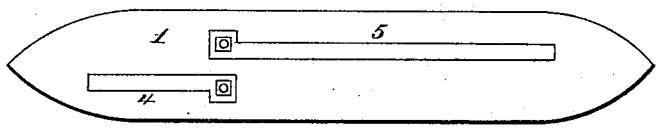
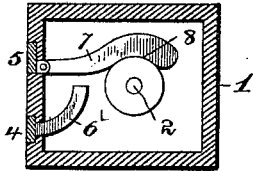  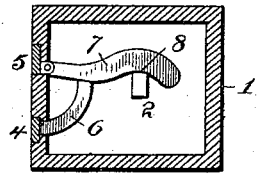
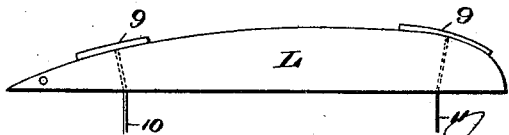
Witnesses:
J. B. McGirr.
Arthur L. Bryant.
Inventor:
John C. Brooks
By Edson Bros
his Attys.

UNITED STATES PATENT OFFICE.

JOHN C. BROOKS, OF PATERSON, NEW JERSEY, ASSIGNOR TO GEORGE DRAPER & SONS, OF HOPEDALE, MASSACHUSETTS.

ELECTRIC STOP-MOTION FOR LOOMS.

SPECIFICATION forming part of Letters Patent No. 473,378, dated April 19, 1892.

Application filed May 14, 1891. Serial No. 392,779. (No model.)

*To all whom it may concern:*

Be it known that I, JOHN C. BROOKS, a citizen of the United States, residing at Paterson, in the county of Passaic and State of New Jersey, have invented certain new and useful Improvements in Electric Stop-Motions for Looms; and I do hereby declare that the following is a full, clear, and exact description of the invention, such as will enable others skilled in the art to which it appertains to make and use the same.

My invention relates to improvements in looms for weaving textile fabrics; and the object is to provide means for automatically stopping the loom before the filling or weft in the shuttle is entirely exhausted, whereby the danger of broken or miss picks or of thick and thin places in the fabric is avoided and a more perfect fabric produced.

With this end in view my invention consists in the combination, with the belt-shifting mechanism and a shuttle of a loom, of a stationary electro-magnet mounted on the frame of the loom and electrically connected with a battery and the shuttle and belt-shifting mechanism, whereby the belt can be automatically shifted to stop the loom before the weft or filling in the shuttle is exhausted.

My invention further consists in the peculiar construction and arrangement of parts, as will be hereinafter fully pointed out and claimed.

I have illustrated my improvements in the accompanying drawings, in which—

Figure 1:
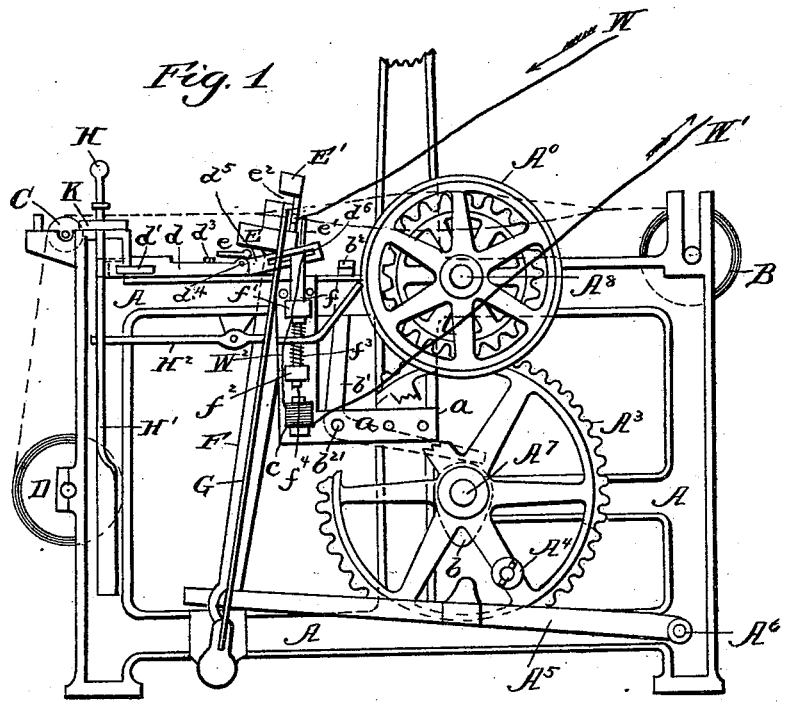
Figure 2:
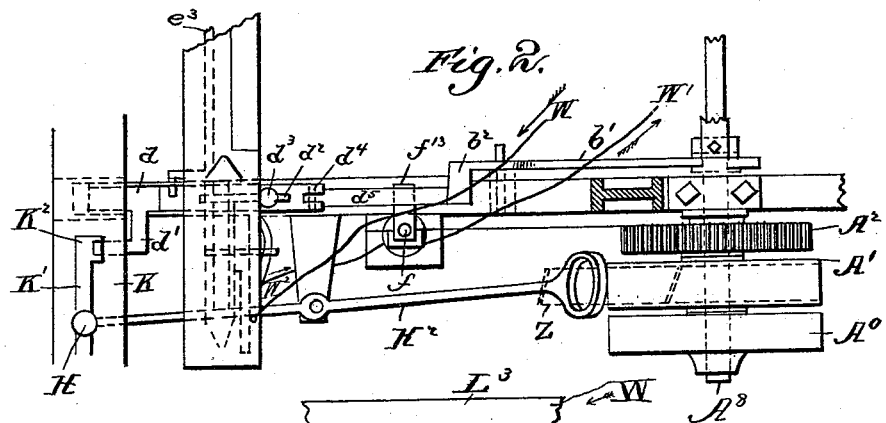
Figure 9:

Figure 1 is an end elevation of a loom having my improvements applied thereto. Fig. 2 is a top plan view of the same. Figs. 3 and 4 are respectively a plan and longitudinal vertical sectional view of a shuttle constructed in accordance with my invention. Fig. 5 is an enlarged transverse sectional view through the shuttle and a portion of the frame of the loom, showing a full quill in position in the shuttle; and Fig. 6 is a similar view showing the quill empty. Fig. 7 is a detail view of the contact-maker in the shuttle. Fig. 8 is a detail view of the face-plate on the shuttle. Fig. 9 is a detail view of the inner face of the binder-swell. Fig. 10 is a sectional plan view on the line $y\,y$ of Fig. 6. Fig. 11 is a detail view of the bobbin or quill. Fig. 12 is a rear face view of a shuttle arranged for using cops. Figs. 13 and 14 are transverse sectional views of the same, showing a full cop and the cop-filling exhausted, respectively. Fig. 15 is a detail view of the swell used in this shuttle.

Like letters and numerals of reference denote corresponding parts in all the figures of the drawings, referring to which—

A designates the frame-work of the loom; $A^\circ$ $A'$, respectively, a driving and loose pulley, which are mounted on a crank-shaft $A^8$. A gear-wheel $A^2$ is also secured on the shaft $A^8$, and this gear meshes with a similar wheel $A^3$, mounted on a shaft $A^7$. To one of the spokes of the wheel $A^3$ is secured a picking-ball $A^4$, and a picking-lever $A^5$ has one end $A^6$ pivoted to the frame A of the loom.

E designates the batten; E', the reed-cap; G, the picking-stick; F, the sword; H', the shipping-lever; H, the handle of such lever; $H^2$, a forked belt-shifting lever; Z, the driving-belt; K, an angle-bracket provided with a longitudinal slot K', which is enlarged at one end to form a notch or recess $K^2$; $d$, a bar mounted on the frame A and having a pin $d^3$ passing through a slot $d^2$ therein and provided with an angular arm $d'$; $e$, a tongue; $e'$, a finger on said tongue $e$; $e^2$, a rod on which said tongue is mounted; $e^3$, a bracket in which said rod is mounted; B, the warp-roller; C, the front breast-roller, and D the cloth-roller.

All of the parts heretofore referred to are of the ordinary construction and arranged in the usual manner of looms of the class to which my invention relates.

On the shaft $A^7$ is fixed a cam $b$, which as the said shaft is rotated contacts with one end of a bell-crank lever $b'$, which is pivoted, as at $b^{21}$, to a bracket $a$, suitably attached to the frame of the loom. The upper end $b^2$ of the lever $b'$, which extends above and is bent to overhang the frame of the loom, as shown in Fig. 2, is thus reciprocated to and fro at each revolution of the shaft $A^7$. A magnet $c$ is supported on the bracket $a$ in such a manner as to be completely insulated from such bracket.

To the bracket $a$, above the magnet $c$ thereon, are attached eyes or guides $f'$ $f^2$, in which is supported an armature $f$. A coiled spring $f^3$ is fitted around the lower reduced portion of the armature $f$, between a shoulder or projection thereon and the eye or guide $f^2$, and keeps said armature normally in an elevated position out of contact with the core of the magnet $c$, as shown in Fig. 1. The upper end of the armature $f$ is bent to form a hook or lip $f^{13}$, and this hook passes through a slot $d^6$ in a lever $d^5$, which is pivoted at one end to the bar $d$ by means of a pin $d^4$. The free end of the lever $d^5$ is normally held in a raised or elevated position, as shown in Fig. 1, by means of the spring $f^3$, so that the upper overhanging end of the bell-crank lever $b'$ passes thereunder at each revolution of the shaft $A^7$.

In Figs. 3 to 6, inclusive, I have illustrated the shuttle of my loom, and, referring particularly to said figures, S designates the outer shell or casing of the shuttle. In the rear side of the casing S is cut a longitudinal slot $S^5$, and in the side walls of said slot is pivoted by means of a pivot-pin $S^2$ a contact-maker R, preferably of the form shown in Figs. 4 and 7. A flat spring-arm $R^2$ is secured in place within the shuttle S by having one end fastened thereto by a pin $R^{21}$, and the free end of such spring-arm holds the end of the contact-maker clear of the filling in the shuttle. In the rear side of the shuttle S, around the slot $S^5$ therein, is arranged a metallic strip or plate $S^3$, said plate being countersunk, so as to lie flush with the surface of the shuttle-casing. A pin $Y'$ extends transversely across the interior of the shuttle and is electrically connected at one end with the metallic plate $S^3$. On this pin $Y'$ is pivoted the shuttle-tongue P, and to said pin is also connected a pair of metallic clips $S^4$ $S^4$ for holding the quill or bobbin Y in position on the shuttle-tongue P. An electric conductor T, preferably of copper wire, is wound several times around the body of the quill Y and once around the recess in the head thereof, in which the clips $S^4$ $S^4$ take when the quill is secured in position for use in the shuttle. In the ordinary shuttle-box or primary swell L, I cut a slot, and in said slot arrange a contact or auxiliary swell N, said auxiliary swell being held in position by a vertical pivot-pin $N^2$, which passes through the auxiliary swell and into the primary swell L on both sides of the slot therein. On the face of the swell L, above and below the slot therein, I attach a contact-plate $L^3$, and this plate is electrically connected with one pole of a battery or generator by means of a conductor W. The contact-swell N is connected with the magnet $c$ by means of a wire $W^2$, and said magnet is connected with the other pole of the battery or generator by means of a wire $W'$. The swell N is formed either of metal or of wood faced or covered with a suitable conductor of electricity. In rear of the swell L is arranged a spring $L'$, and to the swell L in rear of the contact-swell N is arranged another spring $N'$.

The operation of my invention is as follows: The belt Z is shifted onto the driving-pulley $A°$ by the shipping-lever $H'$, which is secured in the notch or recess $K^2$, and the shaft $A^7$, revolved through the medium of the shaft $A^8$ and gear-wheels $A^2$ $A^3$. At every revolution of the shaft $A^7$ the cam $b$ thereon contacts with the lower arm of the bell-crank lever $b^8$ and gives to the upper arm of such lever a reciprocating movement. As the lever $d^5$ is normally held in an elevated position by the coiled spring $f^3$ on the armature $f$, there is nothing to prevent this reciprocating movement of the crank $b'$. At each revolution of the wheel $A^3$ the picking-ball $A^4$ thereon contacts with a projection on the picking-lever $A^5$ and communicates the required motion to the picking-stick G, and the shuttle S is driven across the race or lathe E through the shedded warp in the usual manner. As the shuttle S is driven across the race the swell L is forced closely against the same by the spring $L'$ and the metallic strip or plate $L^3$ on such swell contacts with plate $S^3$ on the shuttle S. As the shuttle completes its forward movement the contact-swell N in the swell L contacts with the contact-maker R in the shuttle. As long as there is sufficient filling on the quill or bobbin to prevent the spring $N'$ from overcoming the spring $R^2$ and forcing the contact-maker R into contact with the conductor T the loom will work. When, however, the filling becomes nearly exhausted, the spring $N'$ forces the swell N into the slot $S^5$ in the shuttle with such force as to overcome the tension of the spring $R^2$ and complete an electric circuit from the battery through the wire W, the swell L, plates $L^3$ and $S^3$, the pin $Y'$, the clips $S^4$ $S^4$, the conductor T, the contact-maker R, the contact-swell N, the wire $W^2$, the magnet, and wire $W'$. As this circuit is closed the magnet $c$ becomes energized and attracts its armature $f$, which overcomes the tension of the coiled spring $f^3$ and draws the lever $d^5$ down into the same plane as the bar $d$ and in the path of the overhanging end $b^2$ of the bell-crank lever $b'$. At the next revolution of the shaft $A^7$ the upper end $b^2$ of the lever $b'$ is forced against the end of the lever $d^5$ and the lever and the bar $d$, attached thereto, are forced forwardly, which movement of the bar $d$ causes the bent arm $d'$ thereon to contact with the shipping-lever $H'$ and force the handle H of the same out of the notch or recess $K^2$. As the lever $H'$ is forced out of the notch $K^2$ it springs back into the position shown in Fig. 2 and shifts the belt Z from the driving-pulley $A°$ to the loose pulley $A'$ and stops the loom. By employing the conductor T on the quill Y there will be enough filling left on the quill after the circuit is completed to complete two picks.

In case it is desired to use my improvements on looms for weaving coarse wide goods a contact-swell $N'$ and conductors W $W^2$ would have to be provided and arranged in each box.

As it is desirable that the magnet $c$ should be quickly demagnetized after each action, I preferably braze a brass stud $f^4$ on the lower end of the armature.

In Figs. 12 to 15, inclusive, I have illustrated a shuttle adapted to be used when applying my improvements to looms in which the filling is formed into cops. Referring particularly to said figures, in which like numerals of reference denote corresponding parts, 1 designates the inclosing case or shell of the shuttle, which is provided with an interior spindle 2, on which the cop is adapted to be placed. To the rear side of the shuttle-case 1 are attached two parallel conducting-plates 4 5. To one end of the plate 4 is attached a lug or stud 6, which passes through a suitable aperture in the rear wall of the case and extends some distance inside thereof, as shown in Figs. 13 and 14. An arm 7 is pivotally connected to the plate 5 above the point where the lug 6 passes through the shell 1, and said arm extends into the shell 1 and has its under side cut away or recessed, as at 8, to fit over the cop. The lug 6 and arm 7 are formed of suitable material capable of conducting an electric current.

In applying my improvements to looms of this class I dispense with the auxiliary swell N and to the main swell L attach suitable contact-plates 9 9', which are connected, respectively, with the magnet $c$ and one pole of a suitable battery or generator by means of conductors 10 11. As the filling of the cop 4 is used the arm 7 descends, and just before the cop is entirely exhausted such arm contacts with the lug 6, and the plates 4 5 being in contact with the contact-plates on the swell L, a circuit is established from the battery through the magnet $c$, the conductors 10 11, contact-plates 9 9', plates 4 5, lug 6, and arm 7 and the belt Z is shifted from the fast to the loose pulley, as hereinbefore described.

I am aware that changes in the form and proportion of parts and details of construction of the devices herein shown and described as an embodiment of my invention can be made without departing from the spirit or sacrificing the advantages thereof, and I therefore reserve the right to make such changes as fairly fall within the scope of my invention.

Having thus fully described my invention, what I claim as new, and desire to secure by Letters Patent, is—

1. In a loom, the combination, with a supporting-frame and driving mechanism, of a bell-crank lever fulcrumed on the supporting-frame, a cam secured on a suitable shaft and adapted to operate said bell-crank lever, a shipping-lever, a bar mounted on the supporting-frame at one side of the shipping-lever and adapted to move longitudinally thereon, a slotted lever pivoted at one end to said bar, an armature connected at one end with the slotted lever, a spring adapted to normally hold the armature and the slotted lever in an elevated position, a shuttle-box having an electric connection with one pole of a battery or generator, a magnet having an electric connection with the other pole of the battery or generator and with the shuttle-box and adapted to move the slotted lever into the path of one arm of the bell-crank lever, and a shuttle adapted to complete the connection between said poles, substantially as and for the purpose described.

2. In a loom, the combination, with a supporting-frame and driving mechanism, of a bell-crank lever fulcrumed on the supporting-frame, a cam mounted on a shaft and adapted to operate the bell-crank lever, a shipping-lever, a bar movably supported on the supporting-frame and having at one end an angular arm adapted to be forced against the shipping-lever, a slotted lever pivoted to the other end of said bar, an armature supported in suitable guides and having one end engaged with the slotted lever and a brass stud on its other end, a coiled spring fitted around said armature between a shoulder thereon and one of its guides, a shuttle-box having an electric connection with one pole of a battery or generator, a magnet having an electric connection with the other pole of the battery or generator and the shuttle-box, and a shuttle adapted to complete the connection between said poles, substantially as and for the purpose described.

3. In a loom, the combination, with a supporting-frame and driving mechanism, of a bell-crank lever fulcrumed on the supporting-frame, a cam carried by a suitable shaft and adapted to contact with one arm of said bell-crank lever, shipping mechanism carried by the supporting-frame at one side of the bell-crank lever, an armature connected to said shipping mechanism, a double swell, a shuttle-box adapted to electrically connect the sections of the swell, a magnet having an electric connection with one pole of a battery or generator and with one of the swells, electric connections between one pole of the battery or generator and the other swell, and a shuttle adapted to complete the connection between said poles, substantially as described.

4. In a loom, the combination, with a supporting-frame and driving mechanism, of shipping mechanism mounted on the supporting-frame, a bell-crank lever fulcrumed on the frame and adapted to operate the shipping mechanism, a cam carried by a shaft and adapted to contact with one arm of the bell-crank lever, a swell having electric connection with one pole of a battery or generator and provided with a slot, a contact-swell pivoted in said slot, a shuttle adapted to electrically connect the two swells, and a magnet connected with one pole of a battery or generator and with the contact-swell, substantially as described.

5. In a loom, the combination, with a supporting-frame and driving mechanism, of shipping mechanism mounted on the supporting-frame, a bell-crank lever fulcrumed on the frame and adapted to operate the shipping mechanism, a cam carried by a shaft and adapted to contact with one arm of the bell-crank lever, an armature connected to the shipping mechanism, a swell having electric connection with one pole of a battery or generator and provided with a slot, metallic plates attached to the face of said swell on opposite sides of the slot therein, a contact-swell pivoted in the slot in the main swell, a shuttle adapted to electrically connnect the swells, and a magnet having electric connection with one pole of a battery or generator and with the contact-swell, substantially as described.

6. In a loom, the combination, with a supporting-frame and driving mechanism, of shipping mechanism, a bell-crank lever fulcrumed on the supporting-frame and adapted to operate the shipping mechanism, a cam carried by the shipping mechanism and adapted to contact with one arm of the bell-crank lever, an armature connected with the shipping mechanism, a swell having electric connection with one pole of a battery or generator and having a longitudinal slot, metallic plates secured in the face of the swell on opposite sides of the slot therein, a contact-swell pivoted in the slot in the main swell, a shuttle having a longitudinal slot in one face, a spring-pressed contact-maker pivoted in the walls of said slot, a contact-plate secured in the face of the shuttle around the slot therein and having electric connection with the pivoted contact-maker, and a magnet having electric connection with one pole of a battery or generator and with the contact-swell, substantially as described.

7. In a loom, the combination, with a supporting-frame and driving mechanism, of shipping mechanism, a bell-crank lever fulcrumed on the frame and adapted to operate the shipping mechanism, a cam carried by a shaft and adapted to contact with one arm of the bell-crank lever, an armature connected to the shipping mechanism, a swell having electric connection with one pole of a battery or generator and provided with a longitudinal slot, conducting-plates attached to one face of the swell on opposite sides of the slot therein, a spring-pressed contact-swell pivoted in the slot in said main swell, a shuttle provided with a longitudinal slot in one face, a spring-pressed contact-maker pivoted in the walls of said slot, a metallic plate attached to one face of the casing around the slot therein, a pin connected at one end to said metallic plate and extending across the interior of the shuttle and carrying the shuttle-tongue, a quill fitted on said tongue and having a wire helix near one end, metallic clips connected to the transverse pin in the shuttle and adapted to contact with the wire helix on the quill, and a magnet having electric connection with one pole of a battery or generator and with the contact-swell, substantially as described.

JOHN C. BROOKS.

Witnesses:
JAS. F. BROOKS,
RICHARD A. HEALY.